(12) United States Patent  (10) Patent No.: US 6,719,126 B2
Badier et al.  (45) Date of Patent: Apr. 13, 2004

(54) DEVICE FOR TRANSFERRING MAIL BINS

(75) Inventors: Frédéric Badier, Saint Péray (FR); Laurent Buffat, Romans (FR); Franck Vigo, Valence (FR)

(73) Assignee: Solystic, Cedex (FR)

( * ) Notice: Subject to any disclaimer, the term of this patent is extended or adjusted under 35 U.S.C. 154(b) by 0 days.

(21) Appl. No.: 10/239,753

(22) PCT Filed: Sep. 12, 2001

(86) PCT No.: PCT/FR01/02829
§ 371 (c)(1),
(2), (4) Date: Sep. 26, 2002

(87) PCT Pub. No.: WO03/022715
PCT Pub. Date: Mar. 2, 2003

(65) Prior Publication Data
US 2003/0047417 A1 Mar. 13, 2003

(51) Int. Cl.⁷ ................................................ B65G 15/00
(52) U.S. Cl. ...................... 198/809; 198/413; 198/463.3
(58) Field of Search ................................ 198/809, 155, 198/597, 370.01, 607, 463.3, 413

(56) References Cited
U.S. PATENT DOCUMENTS

| | | | | |
|---|---|---|---|---|
| 1,929,204 A | * | 10/1933 | Jeffrey et al. | 198/809 |
| 1,980,261 A | * | 11/1934 | Fenton | 198/809 |
| 3,086,640 A | * | 4/1963 | Verrinder | 198/809 |
| 3,756,374 A | * | 9/1973 | Burt et al. | 198/809 |
| 4,541,520 A | * | 9/1985 | Greenlee, III | 198/598 |
| 4,730,718 A | * | 3/1988 | Fazio et al. | 198/597 |
| 4,926,999 A | * | 5/1990 | Fauth, Sr. et al. | 198/358 |
| 4,962,841 A | * | 10/1990 | Kloosterhouse | 198/372 |
| 5,743,375 A | * | 4/1998 | Shyr et al. | 198/463.3 |
| 6,505,733 B2 | * | 1/2003 | Troupos et al. | 198/809 |

* cited by examiner

Primary Examiner—Douglas Hess
(74) Attorney, Agent, or Firm—Sughrue Mion, PLLC

(57) ABSTRACT

The transfer device for a linear conveyor comprises a fixed framework (5) placed on one side of the linear conveyor (2) and means for moving objects towards the framework in a transfer direction that is different from the conveying direction of said conveyor. These means comprise an object transporter structure (6) mounted in said framework (5) to move in a substantially vertical direction in order to occupy a transfer position in which the transporter structure is disposed above the linear conveyor (2) or a retracted position in which the transporter structure is disposed below the linear conveyor (2). The transporter structure (6) extends across the linear conveyor (2) and extends in the transfer direction on one side of the conveyor. The transfer device can be used in a postal sorting machine for handling mail bins.

9 Claims, 6 Drawing Sheets

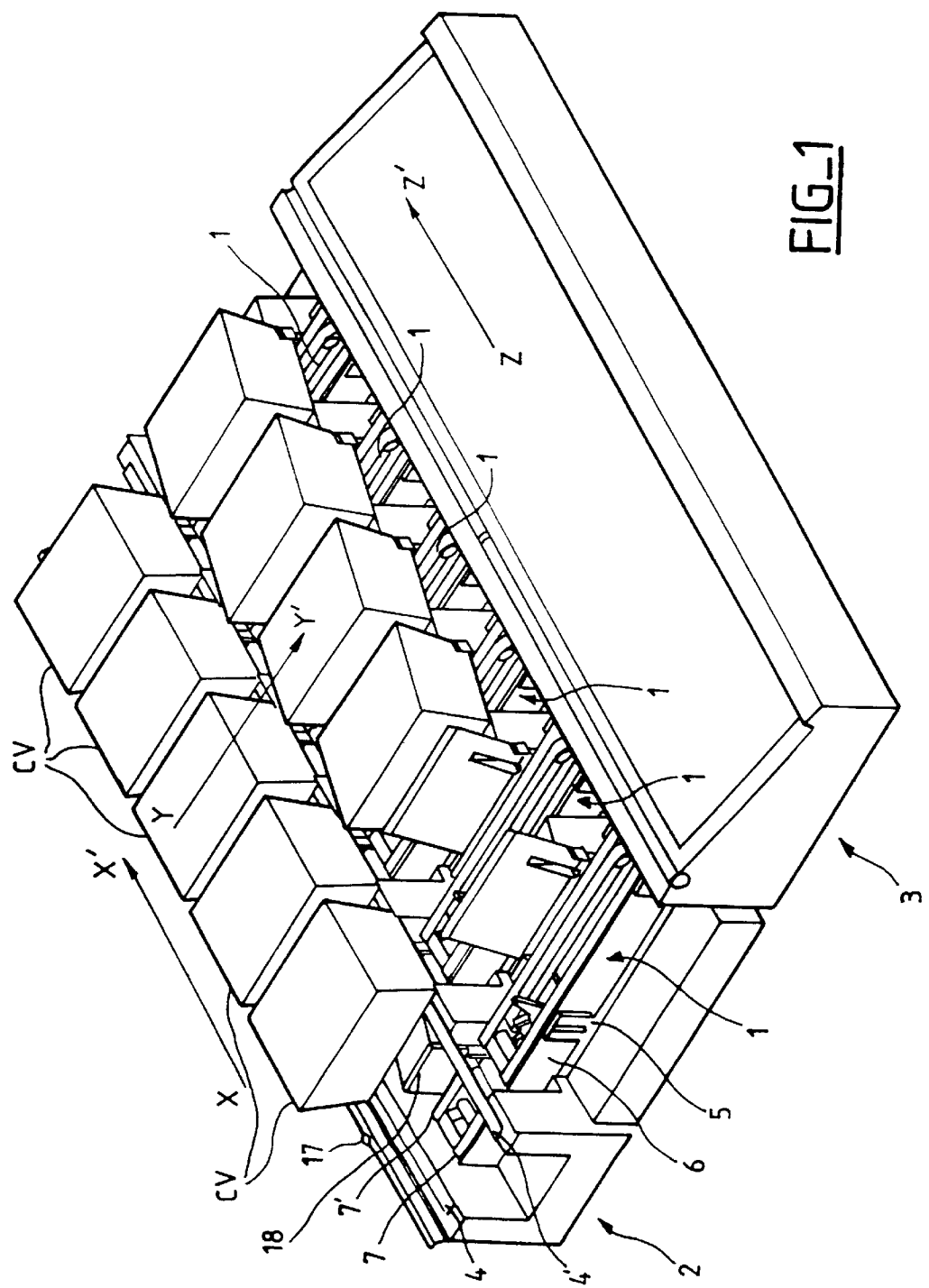
FIG_1

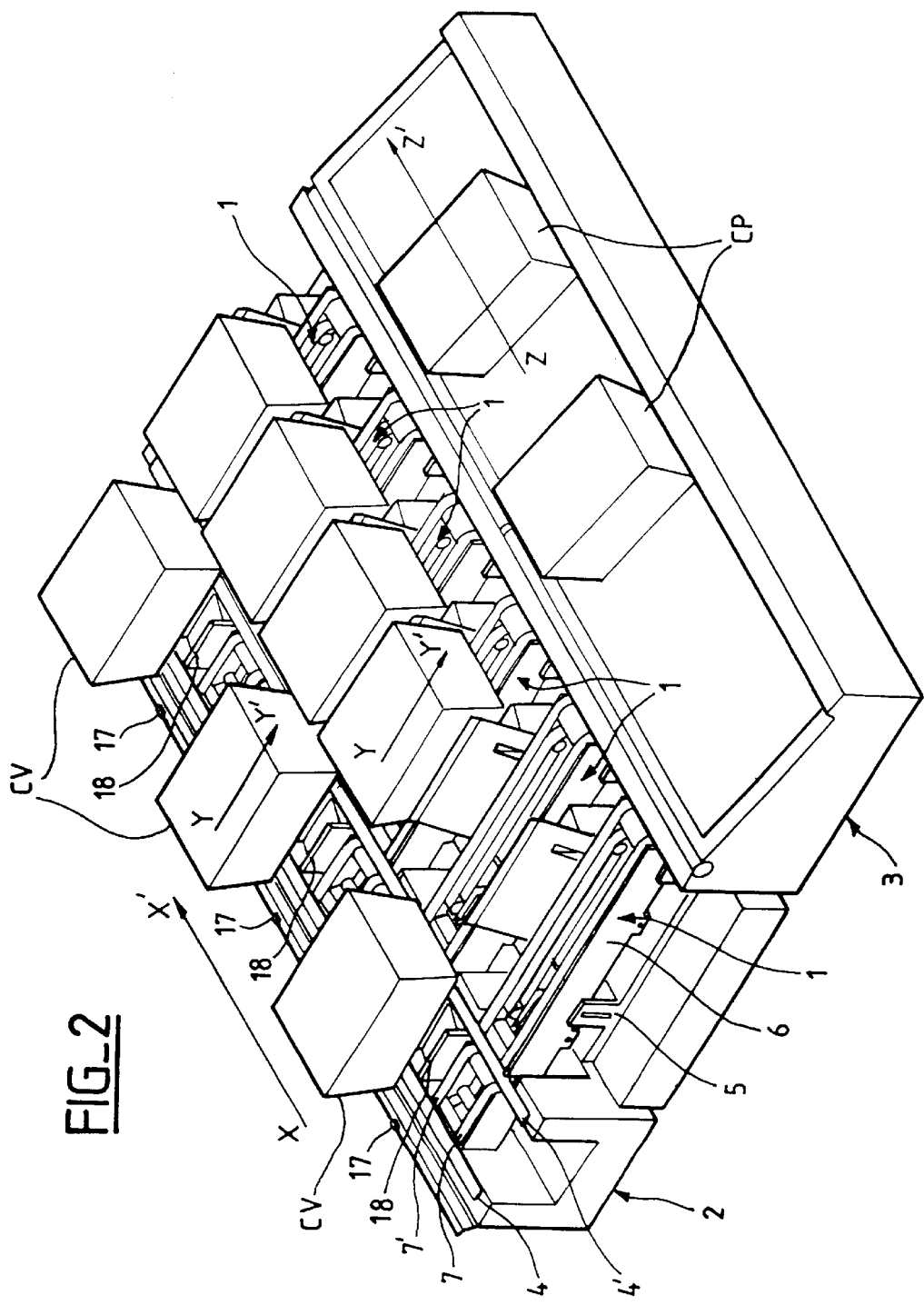
FIG_2

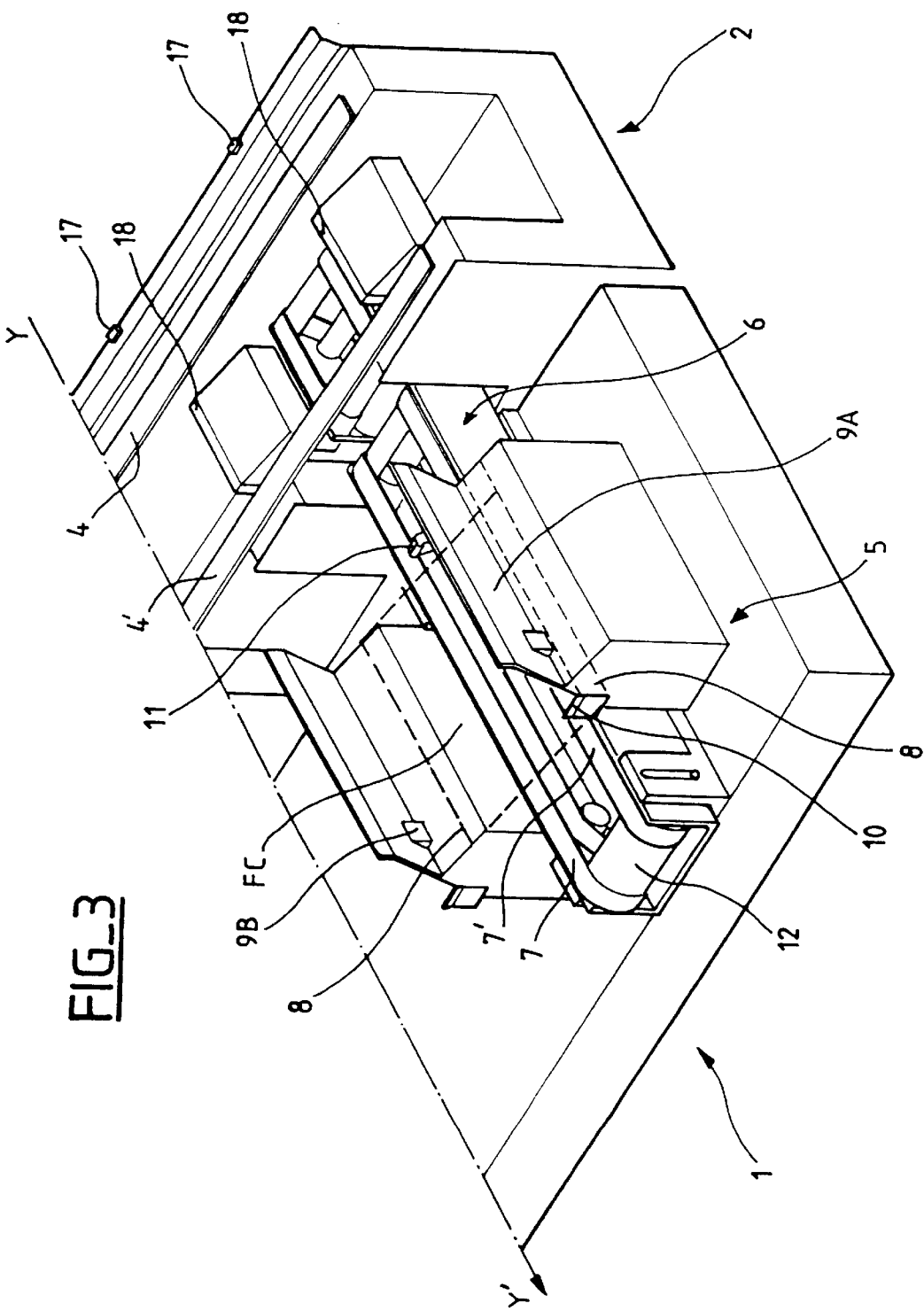
FIG_3

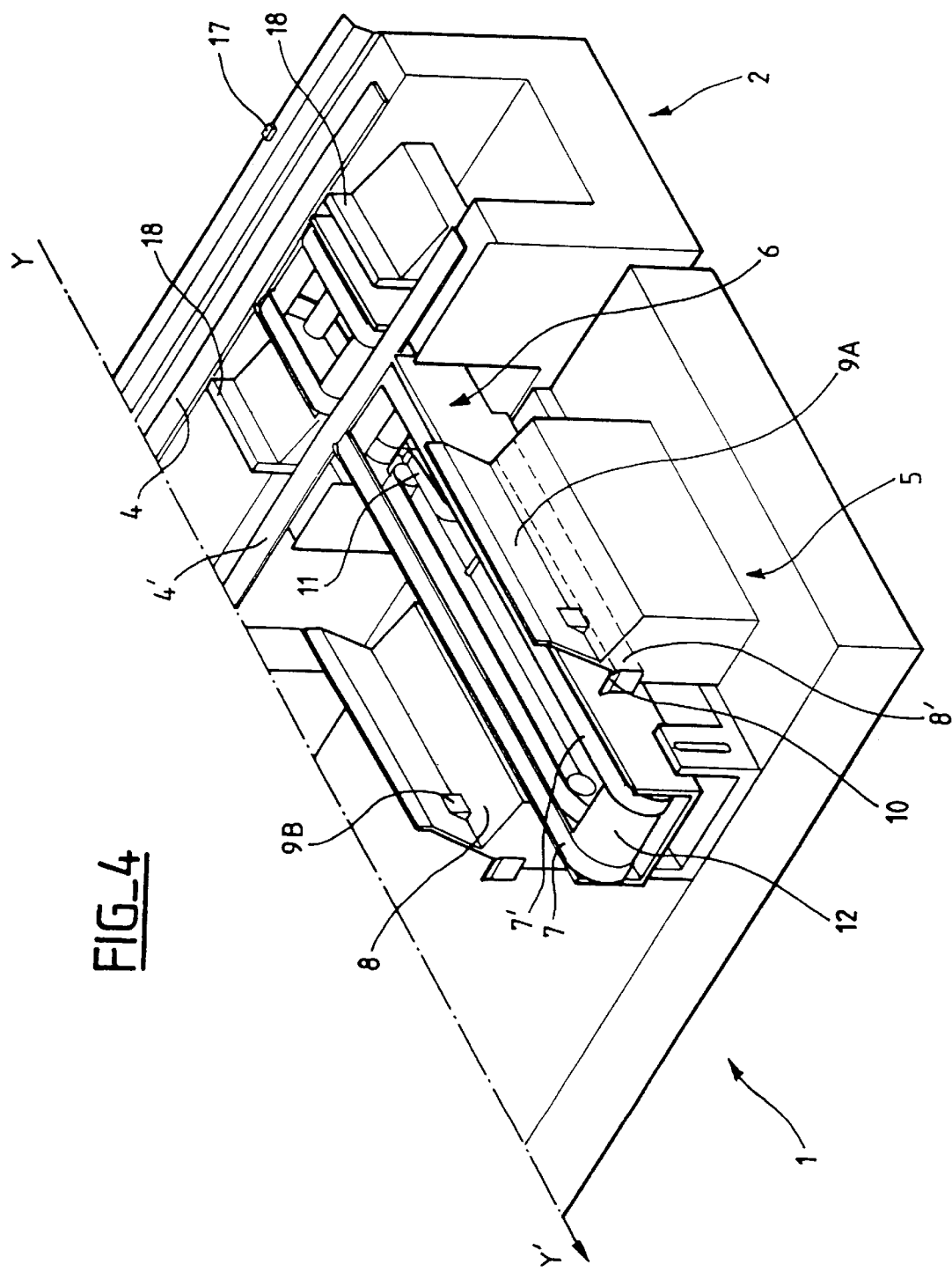
FIG_4

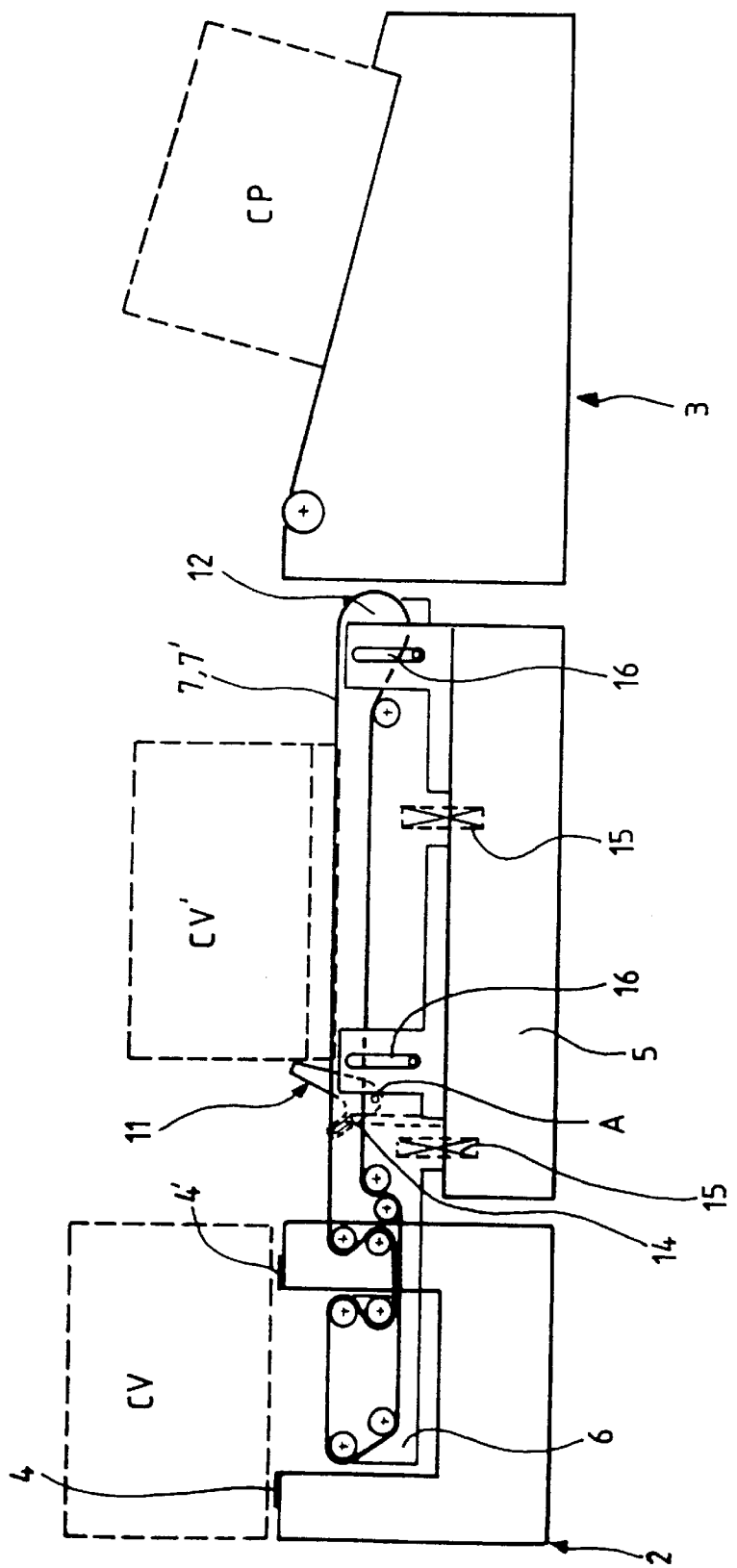
FIG_5

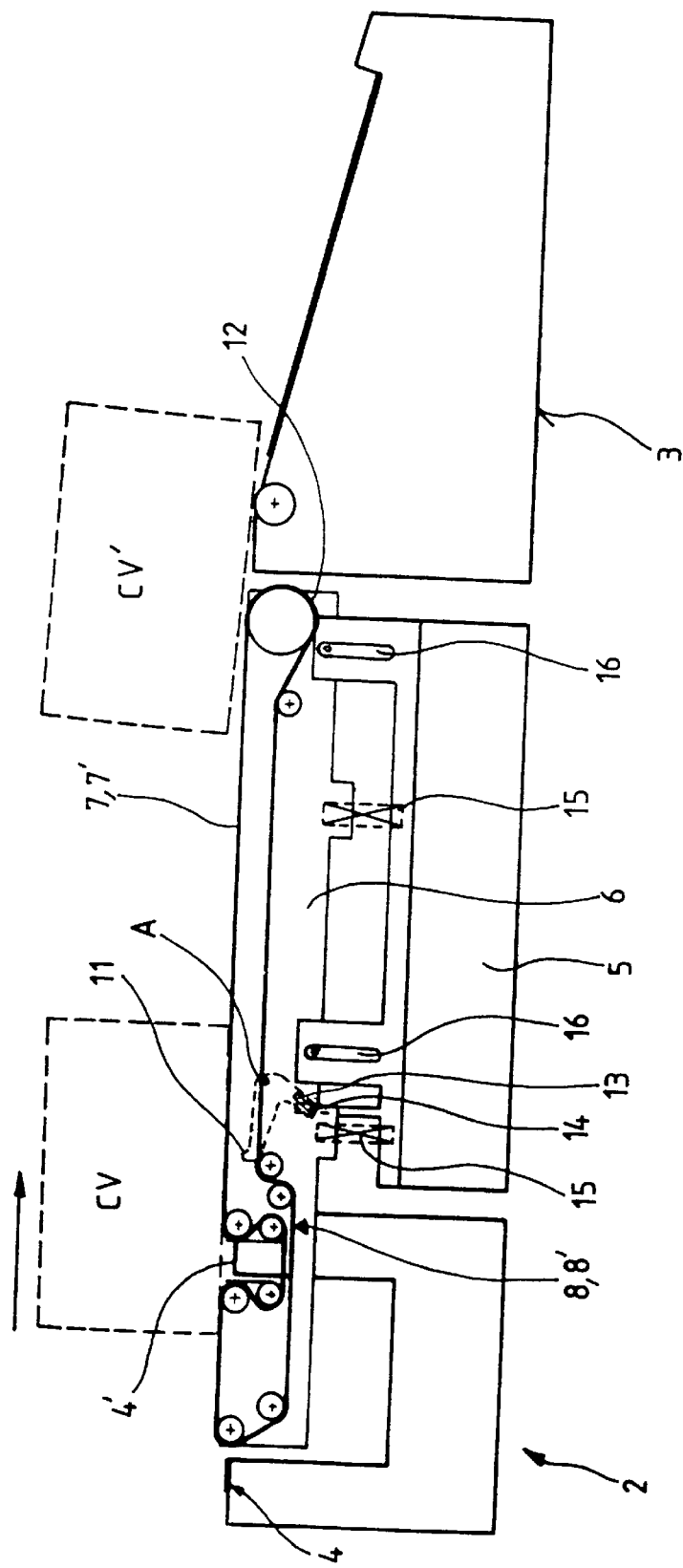

DEVICE FOR TRANSFERRING MAIL BINS

The invention relates to a transfer device for a linear conveyor, and more particularly for a conveyor for conveying mail bins used in a postal sorting machine.

French Patent Document No. 2 772 734 discloses a transfer device for a linear conveyor for conveying various parcels, that conveyor having swinging angled levers suitable for selectively exerting a thrust force on the parcels placed on the conveyor so as to move them to a fixed framework, the direction of thrust being substantially perpendicular to the parcel conveying direction. That framework is disposed between the linear parcel conveyor and another conveyer of any type serving to remove the parcels as they arrive at that location. A parcel already present on the framework is removed from the framework to the removal conveyor by thrust from another parcel placed on the conveyor, the other parcel itself being pushed towards the framework by a swinging angled lever of the transfer device.

A swinging lever is not suitable for transferring mail bins because the bearing force that it can exert on an empty mail bin resting on the linear conveyor is a point force that might deform the bin, especially when the empty bin reacts by pushing a bin that is present on the framework and that is filled with mail items. In addition, since the area of contact between the swinging lever and the mail bin is small, a vertical reaction can occur between the full bin as pushed by the empty bin and the empty bin pushing it if the faces of the bins are not parallel (for example, if they are tilted) or if they have ribs. When a linear conveyor as known from that document is used in a postal sorting machine, the location of the framework corresponds to a sorting outlet at which the mail items are tipped into a mail bin. Under the sorting outlets, it can be necessary to place bins in a tilted position rather than flat, so as to avoid losing mail items, and so as to obtain more orderly stacking of the mail items in the bins. Unfortunately, the configuration of the transfer device known from that document does not make it possible to bring an empty bin to a tilted position on the framework.

An object of the invention is, more particularly, to remedy those drawbacks by providing a transfer device suitable for extracting an empty bin from a linear conveyor and for moving it flat to a loading location corresponding to a sorting outlet where it is placed so that it is tilted at the same time as a tilted full bin resting at this location is being extracted and moved flat to a removal conveyor.

To this end, the invention provides a transfer device for a linear conveyor, the transfer device comprising a fixed framework placed on one side of the linear conveyor and means for moving objects towards the framework in a transfer direction that is different from the conveying direction of said conveyor, said transfer device being characterized in that said means comprise an object transporter structure mounted in said framework to move in a substantially vertical direction in order to occupy a transfer position in which the transporter structure is disposed above the linear conveyor or a retracted position in which the transporter structure is disposed below the linear conveyor, and in that said transporter structure extends across the linear conveyor and extends in the transfer direction on one side of the conveyor. With such a transfer device, an empty mail bin resting on the linear conveyor is raised by the transporter structure above the linear conveyor to be moved in a transfer direction, while a full mail bin resting on the transporter structure at the framework is being removed without being pushed by the empty bin. As a result, neither the empty bin nor the full bin undergo deformation while they are being transferred.

To make it possible for an object extracted from the linear conveyor to be put in a tilted position on the framework after it has been transferred from the linear conveyor, provision is made in the transfer device of the invention for the framework to form two horizontal margins which are substantially parallel to the transfer direction on the side of the conveyor, and between which the transporter structure can be raised and lowered. The transporter structure is disposed below the two margins when it occupies its retracted position, and above the two margins when it occupies its transfer position, and the two margins are offset in the vertical direction. In this way an object placed on the transporter structure can rest on the two margins so that it is tilted when the transporter structure is in its retracted position.

To make it possible for a tilted object to be positioned accurately on the framework, the framework is provided with an abutment disposed at one end of a margin. In addition, a pivotally-mounted lever is provided to exert a thrust force on the transporter structure towards said abutment when the transporter structure is moved from its transfer position to its retracted position.

The transfer device of the invention is particularly suitable for a linear conveyor having two motor-driven parallel belts. In which case, the transporter structure may be provided with one or more motor-driven belts serving to transfer objects in said transfer direction. The one or more motor-driven belts of the transporter structure are guided in the transporter structure to form a substantially horizontal transport surface in two portions, one of the two portions extending between the two belts of the linear conveyor, and the other portion extending on said side of the linear conveyor.

A plurality of transfer devices of the invention may be disposed in succession along a linear conveyor by extending across said conveyor at right angles or at some other angle. Similarly, a plurality of linear conveyors, each of which is equipped with a plurality of transfer devices may be superposed to handle mail bins automatically in a postal sorting machine having a plurality of sorting levels.

The characteristics and advantages of the transfer device of the invention will appear more clearly on reading the following description of an embodiment shown in the drawings, in which:

FIG. 1 is a diagrammatic perspective view from above, showing a set of transfer devices of the invention, disposed between a linear conveyor for conveying empty mail bins and a system for removing full bins;

FIG. 2 is a diagrammatic perspective view from above, showing the set of transfer devices of FIG. 1 in the bin transfer position;

FIG. 3 is a diagrammatic perspective view from above, showing a transfer device of the invention in the retracted low position;

FIG. 4 is a diagrammatic perspective view from above, showing the transfer device of the invention in the transfer high position;

FIG. 5 is a diagrammatic section view showing a transfer device of the invention in the retracted low position; and FIG. 6 is a diagrammatic section view of a transfer device of the invention in the transfer high position.

As shown in FIG. 1, a plurality of transfer devices 1 of the invention are placed in succession at points of transfer between a conveyor 2 for conveying empty mail bins CV and a conveyor 3 for removing full bins, the transfer devices 1 and the conveyors 2 and 3 are part of a postal sorting machine (not shown).

The conveyor 2 moves the empty bins CV flat in a conveying direction XX'. In this example, the conveyor 2 is a conveyor having two motor-driven parallel belts 4, 4'.

The bins CV are rectangular block shaped, they rest flat on the belts of the conveyor 2, and they have their top faces open.

The removal conveyor 3 is also a conveyor having belts, but it could be of any type making it possible to remove the full mail bins as they reach this location.

Each transfer device 1 comprises a fixed framework 5 disposed on one side of the conveyor 2 and in which a transporter structure 6 is mounted to move. In this example, the transporter structure comprises two parallel motor-driven transporter belts 7, 7" that extend in a transfer direction YY' in which the bins CV are transferred. In this example, the transfer direction YY' is perpendicular to the conveying direction XX'.

The transporter structure 6 of a transfer device 1 extends across the conveyor 2 and extends in the transfer direction YY' on that side of the conveyor 2 on which the framework 5 is laid. As shown in FIGS. 1 and 2, the motor-driven belts 7, 7' of the transporter structure 6 are guided to form a substantially horizontal bin-transporting surface in two portions. One of the two portions of the transporting surface extends between the belts 4, 4' of the conveyor 2 and the other portion extends on that side of the conveyor 2 on which the framework 5 is laid.

The transporter structure 6 is mounted in the framework 5 so as to be moved in the vertical direction between a retracted position shown in FIG. 1 and in which it is disposed below the conveyor 2, in particular in its portion situated between the belts 4, 4' of the conveyor 2, and a transfer position shown in FIG. 2, and in which it is disposed above the conveyor 2. When the transporter structure 6 is in the retracted position, the empty bins CV can travel along the conveyor 2 to be brought to the various points of transfer. When in the transfer position, the transporter structure extracts an empty bin from the conveyor 2 by raising it, and transfers it in the direction YY' above the belts 4, 4' of the conveyor 2 so as to bring it to the location of the framework 5 where it can be loaded with mail by the mail items being tipped from the containers of a carrousel of the postal sorting machine traveling along the conveyor 2 above the frameworks 5 of the transfer devices.

As shown in FIG. 1, when the transporter structure 6 is in the retracted position, the empty bins CV extracted from the conveyor 2 rest on the frameworks 5 in a tilted position, thereby preventing loss of mail items during loading of the bins, and improving the orderliness of the mail items inside the bins.

As shown in FIG. 2, certain full mail bins CP placed on the transporter structures 6 of the transfer devices 1 are removed flat by the removal conveyor 3 at the same time as the empty bins CV extracted from the conveyor 2 by the transfer devices are being brought flat to the location of the frameworks 5 to be loaded with mail. In this example, the removal direction ZZ' in which the full bins CP are removed is parallel to the conveying direction XX' in which the empty bins are conveyed, thereby reducing the floor area occupied by the installation.

FIG. 3 shows a transfer device 1 of the invention, with its transporter structure 6 in the retracted position and extending across the conveyor 2. The framework 5 of the transfer device forms two horizontal margins 8, 8' which are substantially parallel to the transfer direction YY' and between which the transporter structure 6 can be raised and lowered. The two margins are offset in the vertical direction so that, when the transporter structure is in the retracted position, the bottom FS of a mail item rests on the two margins so that it is tilted relative to the horizontal plane. When in this retracted position, the transporter structure is naturally disposed below the two margins 8, 8', whereas, when in the transfer position (as shown in FIG. 4), the transporter structure is disposed above the two margins 8, 8'. The tilt angle of the bin as resting on the margins 8, 8' is about 20°. When the transporter structure 6 is moved from its retracted position to its transfer position, a tilted full bin resting on the two margins 8, 8' is brought back upright at the same time as it is being raised by the transporter structure 6 to be transferred flat to the removal conveyor 3.

A tilted flap 9A is mounted along the lower margin 8' to guide an empty bin or a full bin as it is being moved vertically while the transporter structure 6 is being moved vertically.

The framework 5 is provided with an abutment 10 disposed at one end of a margin (the lower margin 8' in this example). A pivotally-mounted lever 11 is provided in the transporter structure 6 to exert a thrust force towards said abutment 10 on an empty bin resting on said structure, when the transporter structure is moved towards its retracted position, so that the empty bin as in the tilted position is positioned accurately.

A sensor 9B may be provided in the flap 9A to detect improper positioning of an empty bin on the margins 8, 8'.

As shown in FIG. 4, the pivotally-mounted lever 11 is retracted into the transporter structure 6 when said structure is in its transfer position so as to enable an empty bin to be moved from the conveyor 2 in the transfer direction YY'. When it is fully raised and in abutment against a bin while the mail items are being tipped into it, as shown in FIG. 3, the pivotally-mounted lever 11 also serves to hold the bin in a fixed position even in the presence of vibration due to the mail items hitting the bin.

The transporter belt(s) of the structure 6 is/are driven by a common motor 12 which is advantageously disposed at one end of the transporter structure 6 to facilitate maintenance operations.

FIGS. 5 and 6 are diagrammatic section views showing the transfer device of the invention in more detail. In FIG. 5, the transporter structure 6 is in its retracted position, and the pivotally-mounted lever 11 is raised against a bin. In FIG. 6, the transporter structure 6 is in its transfer position, and the pivotally-mounted lever 11 is retracted into the structure 6.

The pivotally-mounted lever 11 is an angled lever mounted to pivot at its bend about an axis associated with the transporter structure. It is provided with a slot 13 in which a wheel 14 is mounted to move at the end of a tab fixed to the framework 5 so that the movement in translation of the transporter structure 6 relative to the framework 5 in the vertical direction is transformed into an angular movement of the lever 11 in the transporter structure.

The system for raising or lowering the transporter structure 6 relative to the framework 5 may be of any type, e.g. a set of motor-driven cams 15 interposed between the structure 6 and the framework 5, combined with guiding in translation 16 in the vertical direction.

In FIG. 5, an empty bin CV is resting on the belts 4, 4' of the conveyor 2. A bin CV' in the process of being loaded is resting tilted on the framework 5, while a full bin CP is resting on the removal conveyor 3. In FIG. 6, the empty bin CV is resting on the belts 7, 7' of the transporter structure, and is being transferred to its loading location while the bin CV' which has been filled with mail is being transferred to the removal conveyor 3.

FIGS. 5 and 6 show the pulleys serving to guide the belts 7, 7' of the transporter structure 6 inside the conveyor 2. These figures show that the two transport surfaces formed by the belts 7, 7' are separated by a gap (the belts 7, 7' are diverted) to avoid the belt 4' of the conveyor 2.

As shown in FIGS. 1 to 4, a set of light-beam sensors 17 are provided along the conveyor 2 at the points of transfer to detect the presence of an empty bin on the conveyor 2 at each point of transfer, and moving abutments 18 can be raised in the conveyor 2 to prevent each empty bin CV that arrives at a point of transfer from moving. In FIGS. 1 and 4, the moving abutments 18 can be raised above the conveyor 2; they prevent the empty bins CV from moving in the conveying direction XX'. In FIGS. 2 and 3, the moving abutments are lowered under the conveyor 2; the empty bins CV can travel along the conveyor 2. As a function of the signals delivered by the sensors 17, a control unit (not shown) actuates the moving abutments 18 for the purpose of providing empty bins at all of the points of transfer.

On the basis of an item of information indicating a state of filling of a bin disposed tilted on a framework 5 of a transfer device, the control unit puts the transporter structure 6 in the transfer position to transfer the full bin to the removal conveyor 3 and, at the same time, to extract an empty bin from the conveyor 2 for the purpose of transferring it to the filling location on the framework 5. The control unit then puts the transporter structure 6 of the transfer device in the retracted position so that the empty bin placed at the loading location is put in the tilted position, and the control unit actuates the moving abutments 18 for feeding a new empty bin to the point of transfer left vacant on the conveyor 2.

Naturally, the transport members of the transporter structure 6 of a transfer device 1 may be constituted by motor-driven wheels or rollers without going beyond the ambit of the invention.

The transfer device of the invention may be used to transport various objects such as parcels or unwrapped consignments, suitcases, containers, etc.

What is claimed is:

1. A transfer device for a linear conveyor, the transfer device comprising a fixed framework placed on one side of the linear conveyor, and an object transporter structure for moving objects towards the framework in a transfer direction that is different from the conveying direction of said conveyor, said transporter structure extending across the linear conveyor and in the transfer direction on one side of the conveyor, said transporter structure being mounted in said framework to move in a substantially vertical direction in order to occupy a transfer position in which the transporter structure is disposed above the linear conveyor or a retracted position in which the transporter structure is disposed below the linear conveyor, wherein said framework forms two substantially parallel and horizontal margins on said side of the conveyor, between which the transporter structure can be raised and lowered, the transporter structure being disposed below the two margins when it occupies its retracted position, and above the two margins when it occupies its transfer position, and wherein the two margins are offset in the vertical direction so that an object placed on the transporter structure rests on the two margins so that it is tilted when the transporter structure is in its retracted position.

2. A transfer device according to claim 1, in which the framework is provided with an abutment disposed at one end of a margin, and in which a pivotally-mounted lever is provided to exert a thrust force on the transporter structure towards said abutment when the transporter structure is moved from its transfer position to its retracted position.

3. A transfer device according to claim 2, in which the angular movement of said lever is associated with the movement in translation of the transporter structure in the vertical direction.

4. A transfer device according to claim 3, in which said lever is mounted to pivot on the transporter structure and is provided with a slot in which a wheel mounted on the frame is mounted to move.

5. A transfer device according to claim 1, for a linear conveyor having two motor-driven parallel belts, in which the transporter structure is provided with one or more motor-driven belts serving to transfer objects in said transfer direction, the one or more motor-driven belts of the transporter structure being guided in the transporter structure to form a substantially horizontal transport surface in two portions, one of the two portions extending between the two belts of the linear conveyor, and the other portion extending on said side of the linear conveyor.

6. A transfer device according to claim 5, in which said belts of the transporter structure are driven by a common motor disposed in the transporter structure.

7. A linear conveyor including a transfer device according to claim 1.

8. A postal sorting machine including one or more linear conveyors according to claim 7 for automatically handling mail bins.

9. A method for transferring an empty mail bin from a linear conveyor towards a fixed framework placed on one side of the linear conveyor and for transferring a full mail bin from the fixed framework towards a removal conveyor, comprising:

raising a transporter structure within the fixed framework, said transporter structure extending across said linear conveyor, for moving flat the full bin towards the removal conveyor and for moving flat the empty bin above the framework; and lowering then the transporter structure between two margins of the framework which are offset in the vertical direction for placing the empty bin in a tilted position for its loading.

* * * * *